United States Patent
Cho et al.

(10) Patent No.: US 11,069,895 B2
(45) Date of Patent: Jul. 20, 2021

(54) ELECTRODE ASSEMBLY FOR SOLID STATE BATTERY AND METHOD FOR MANUFACTURING THE SAME

(71) Applicant: LG CHEM, LTD., Seoul (KR)

(72) Inventors: Sung-Ju Cho, Daejeon (KR); Ho-Suk Shin, Daejeon (KR); Seung-He Woo, Daejeon (KR); Sung-Joong Kang, Daejeon (KR); Hyea-Eun Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 146 days.

(21) Appl. No.: 16/311,601

(22) PCT Filed: Mar. 16, 2018

(86) PCT No.: PCT/KR2018/003115
§ 371 (c)(1),
(2) Date: Dec. 19, 2018

(87) PCT Pub. No.: WO2018/169359
PCT Pub. Date: Sep. 20, 2018

(65) Prior Publication Data
US 2019/0207220 A1    Jul. 4, 2019

(30) Foreign Application Priority Data
Mar. 16, 2017    (KR) .................. 10-2017-0033363

(51) Int. Cl.
*H01M 4/62*    (2006.01)
*H01M 4/139*    (2010.01)
(Continued)

(52) U.S. Cl.
CPC ......... *H01M 4/622* (2013.01); *H01M 4/0404* (2013.01); *H01M 4/139* (2013.01);
(Continued)

(58) Field of Classification Search
CPC .... H01M 4/622; H01M 4/0404; H01M 4/139; H01M 10/0565; H01M 10/0585; H01M 2300/0082
See application file for complete search history.

(56) References Cited

U.S. PATENT DOCUMENTS 9,276,263 B2    3/2016    Yoshida et al.
9,318,765 B2    4/2016    Matsuda et al.
(Continued)

FOREIGN PATENT DOCUMENTS

JP    2000-113872 A    4/2000
JP    2001-273929 A    10/2001
(Continued)

OTHER PUBLICATIONS

KR 10-2017-0012962 A online machine translaiton, translated on Jul. 0, 2020.*
(Continued)

*Primary Examiner* — Golam Mowla
(74) *Attorney, Agent, or Firm* — Birch, Stewart, Kolasch & Birch, LLP

(57) ABSTRACT

An electrode assembly for a solid state battery includes a positive electrode, a negative electrode and a solid electrolyte layer interposed between the positive electrode and the negative electrode. In addition, the binder disposed at the interface between the negative electrode and the solid electrolyte layer, the interface between the positive electrode and the solid electrolyte layer and/or at a predetermined depth from the interface is crosslinked to form a three-dimensional network. In other words, in the electrode assembly, the binder contained in the negative electrode and the solid electrolyte layer and/or the binder contained in the positive electrode and the solid electrolyte layer is crosslinked to improve the interfacial binding force between the negative electrode and the solid electrolyte layer and/or between the (Continued)

positive electrode and the solid electrolyte layer, and thus ion conductivity is maintained to a significantly high level.

10 Claims, 1 Drawing Sheet

(51) Int. Cl.
*H01M 4/04* (2006.01)
*H01M 10/0565* (2010.01)
*H01M 10/0585* (2010.01)

(52) U.S. Cl.
CPC ... *H01M 10/0565* (2013.01); *H01M 10/0585* (2013.01); *H01M 2300/0082* (2013.01)

(56) References Cited

U.S. PATENT DOCUMENTS

| | | | |
|---|---|---|---|
| 9,419,285 | B2 | 8/2016 | Hoshiba et al. |
| 9,634,358 | B2 | 4/2017 | Matsushita |
| 2001/0024756 | A1 | 9/2001 | Yamasaki |
| 2011/0195314 | A1 | 8/2011 | Yu et al. |
| 2012/0177997 | A1 | 7/2012 | Nakamoto et al. |
| 2015/0188195 | A1* | 7/2015 | Matsushita ....... H01M 10/0525 429/152 |
| 2017/0288144 | A1 | 10/2017 | Makino et al. |

FOREIGN PATENT DOCUMENTS

| | | |
|---|---|---|
| JP | 2002-367677 A | 12/2002 |
| JP | 2003-22839 A | 1/2003 |
| JP | 2014-112485 A | 6/2014 |
| JP | 2015-125872 A | 7/2015 |
| JP | 2015-230805 A | 12/2015 |
| JP | WO2016/125716 A1 | 8/2016 |
| KR | 10-2002-0080797 A | 10/2002 |
| KR | 10-0846139 B1 | 7/2008 |
| KR | 10-2010-0016919 A | 2/2010 |
| KR | 10-2012-0132526 A | 12/2012 |
| KR | 10-2014-0074181 A | 6/2014 |
| KR | 10-2017-0012962 A | 2/2017 |
| WO | WO 2010/089891 A1 | 8/2010 |
| WO | WO 2012/173089 A1 | 12/2012 |

OTHER PUBLICATIONS

KR 10-0846139 B1 online machine translaiton, translated on Jul. 0, 2020.*
International Search Report issued in PCT/KR2018/003115 (PCT/ISA/210), dated Jul. 2, 2018.

* cited by examiner

ELECTRODE ASSEMBLY FOR SOLID STATE BATTERY AND METHOD FOR MANUFACTURING THE SAME

TECHNICAL FIELD

The present application claims priority to Korean Patent Application No. 10-2017-0033363 filed on Mar. 16, 2017 in the Republic of Korea. The present disclosure relates to a battery which shows improved interfacial binding force between an electrode and an electrolyte layer and thus has excellent ion conductivity and output characteristics, and a method for manufacturing the same.

BACKGROUND ART

A lithium ion secondary battery has been used widely as an electric power source system for portable electronic instruments. In addition, recently, there is a tendency to use a lithium ion secondary battery as a battery for electric vehicles or industrial battery. The structure of a lithium ion secondary battery is relatively simple and includes the three main elements of a negative electrode active material, a positive electrode active material and an electrolyte. As lithium ions move from a positive electrode to a negative electrode and from the negative electrode to the positive electrode, operation of the battery is performed. The electrolyte portion merely functions as a lithium ion conductor. In a widely used lithium ion secondary battery, an electrolyte solution containing a lithium salt dissolved in an aprotic organic solvent is used. However, such an electrolyte solution causes some problems during use, including leakage of the electrolyte or gas generation. Thus, there has been a need to develop a solid state battery to solve the above-mentioned problems.

As compared to a battery using an electrolyte solution, a solid electrolyte is advantageous in that it provides improved stability, a battery having an optimized structure, high energy density, high output density, or the like. However, a solid state battery has a small ion conduction channel due to low interfacial contact with an electrode, and thus is problematic in that it causes a decrease in ion conductivity.

DISCLOSURE

Technical Problem

The present disclosure is directed to providing an electrode assembly for a solid state battery which shows improved ion conductivity between an electrode layer and an electrolyte layer, and a method for manufacturing the same. These and other objects and advantages of the present disclosure may be understood from the following detailed description. Also, it will be easily understood that the objects and advantages of the present disclosure may be realized by the means shown in the appended claims and combinations thereof.

Technical Solution

To solve the above-mentioned technical problem, the present disclosure provides a method for manufacturing a solid state battery and a battery obtained thereby. According to an embodiment of the present disclosure, the method for manufacturing a solid state battery includes the following steps (S10)-(S60) of: (S10) preparing at least one negative electrode, at least one positive electrode and at least one solid electrolyte layer; (S20) carrying out stacking in such a manner that the solid polymer electrolyte layer is interposed between the negative electrode and the positive electrode to prepare a stacked structure; (S30) pressing the stacked structure to form an electrode assembly (a); (S40) mixing a crosslinking initiator with a solvent to prepare a crosslinking agent solution; (S50) impregnating the electrode assembly (a) with the solution; and (S60) warming the impregnated electrode assembly (a) to form an electrode assembly (a').

Herein, step (S60) may be carried out in such a temperature range that crossliniking may be initiated and performed in the electrode assembly (a').

According to a second embodiment of the present disclosure, there is provided the method for manufacturing a solid state battery of the first embodiment, wherein the positive electrode and the negative electrode are obtained by the method including the following steps of: preparing a slurry for forming an electrode layer including an electrode active material, a binder resin, an inorganic solid electrolyte and a solvent, wherein the solvent is a nonpolar solvent; applying the slurry for forming the electrode layer to the surface of a current collector, followed by drying, to form a first electrode layer; and pressing the first electrode layer to form a second electrode layer.

According to a third embodiment of the present disclosure, there is provided the method for manufacturing a solid state battery of the first or the second embodiment, wherein the solid polymer electrolyte layer is obtained by the method including the following steps of: preparing a slurry for forming the solid polymer electrolyte layer including a binder resin, an inorganic solid electrolyte and a solvent, wherein the solvent is a nonpolar solvent; applying the slurry to a release sheet, followed by drying, to form the solid polymer electrolyte layer; and separating the solid polymer electrolyte layer from the release sheet.

According to a fourth embodiment of the present disclosure, there is provided the method for manufacturing a solid state battery of any one of the first to the third embodiments, wherein the solvent in step (S40) is a nonpolar solvent.

According to a fifth embodiment of the present disclosure, there is provided the method for manufacturing a solid state battery of any one of the first to the fourth embodiments, wherein the negative electrode, the positive electrode and the solid polymer electrolyte layer include a binder resin, and the binder resin includes a rubber-based resin.

According to a sixth embodiment of the present disclosure, there is provided the method for manufacturing a solid state battery of any one of the first to the fifth embodiments, wherein the crosslinking initiator in step (S40) is an organic peroxide-based crosslinking initiator.

According to a seventh embodiment of the present disclosure, there is provided the method for manufacturing a solid state battery of the sixth embodiment, wherein the organic peroxide-based crosslinking initiator is at least one selected from the group consisting of di(2-ethylhexyl)peroxydicarbonate, di(4-t-butylcyclohexyl)peroxydicarbonate, di-sec-butylperoxydicarbonate, t-butylperoxyneodecanoate, t-hexylperoxy pivalate, t-butylperoxy pivalate, dilauroyl peroxide, di-n-octanoyl peroxide, 1,1,3,3-tetramethyl-butylperoxy-2-ethylhexanoate, di(4-methylbenzoyl) peroxide, dibenzoyl peroxide, t-butylperoxyisobutyrate and 1,1-di(t-hexylperoxy)cyclohexane.

In another aspect, there is provided a battery obtained by the method as defined in any one of the first to the seventh embodiments.

According to an eighth embodiment, there is provided a battery which includes a binder polymer resin crosslinked to form an interlayer continuous phase at the interface between the negative electrode and the solid polymer electrolyte layer and at the interface between the positive electrode and the solid polymer electrolyte layer.

According to a ninth embodiment, there is provided the battery of the eighth embodiment, wherein the binder resin includes a rubber-based binder resin, According to a tenth embodiment, there is provided the battery of the ninth embodiment, wherein the rubber-based binder resin includes at least one selected from the group consisting of natural rubber, butyl rubber, bromobutyl rubber, chlorobutyl rubber, styrene isoperene rubber, styrene-ethylene-butyrene-styrene rubber, acrylonitrile-butadiene-styrene rubber, polybutadiene rubber, nitrile butadiene rubber, styrene butadiene rubber, styrene butadiene styrene (SBS) rubber and ethylene propylene diene monomer (EPDM) rubber.

Advantageous Effects

The electrode assembly for a solid state battery obtained from the method according to the present disclosure shows excellent binding force between an electrode and an electrolyte layer and thus maintains ion conductivity to a high level, thereby providing improved battery performance.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shapes, sizes, scales or ratios of the elements in the accompanying drawing may be exaggerated for the purpose of more clear description.

BEST MODE

Figure 1:
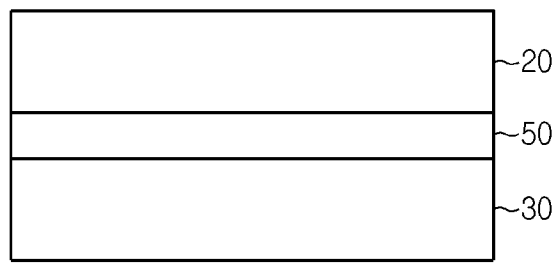
FIG. 1 is a schematic view illustrating the electrode assembly for a solid state battery according to the present disclosure.

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

It will be understood that the terms "comprises" and/or "comprising", or "includes" and/or "including" when used in this specification, refer to the presence of any stated element, but do not preclude the addition of one or more other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

In the following specification, specific terms are used for convenience and are not limiting. Such terms as 'right', 'left' 'top surface' and 'bottom surface' refer to the directions as shown in the drawings to which reference is made. Such terms as 'internally' and 'externally' refer to the directions toward or away from the geometrical centers of the designated devices, systems and members thereof. The terms 'front', 'rear', 'up', 'down' and related words and phrases refer to the locations and bearings in the drawing to which reference is made and are not limiting. The same is also applied to the above-listed words, derivatives thereof and synonyms thereof.

The present disclosure relates to a method for manufacturing a lithium ion secondary battery and a battery obtained thereby. According to the present disclosure, the lithium ion secondary battery may be a solid state battery using an inorganic solid electrolyte and/or polymer electrolyte as an electrolyte.

According to an embodiment of the present disclosure, the lithium ion secondary battery includes an electrode assembly including a positive electrode, a negative electrode and a solid electrolyte layer interposed between the positive electrode and the negative electrode. In addition, in the electrode assembly, the binder (binder resin) disposed at the interface between the negative electrode and the solid electrolyte layer, the interface between the positive electrode and the solid electrolyte layer and/or at a predetermined depth from the interface is crosslinked to form a three-dimensional network. In other words, in the electrode assembly according to the present disclosure, the binder (binder resin) contained in the negative electrode and the solid electrolyte layer and/or the binder contained in the positive electrode and the solid electrolyte layer is crosslinked to improve the interfacial binding force between the negative electrode and the solid electrolyte layer and/or between the positive electrode and the solid electrolyte layer and to provide increased adhesion, and thus ion conductivity is maintained to a significantly high level.

FIG. 1 is a schematic view illustrating the electrode assembly according to an embodiment of the present disclosure. Referring to FIG. 1, the electrode assembly 100 includes a positive electrode 20, a negative electrode 30, and a solid electrolyte layer 50 interposed between the positive electrode and the negative electrode.

First, the positive electrode and the negative electrode will be explained. Each of the positive electrode and the negative electrode is generally referred to as an electrode herein. According to an embodiment of the present disclosure, the electrode includes a current collector and an electrode active material layer formed on at least one surface of the current collector. The electrode active material layer includes an electrode active material, a solid electrolyte, a binder (binder resin) and a conductive material. Meanwhile, according to an embodiment of the present disclosure, the binder may be crosslinked. The solid electrolyte may be present in the electrode active material layer in an amount of 5-100 parts by weight based on 100 parts by weight of the electrode active material. In addition, the binder (binder resin) may be present in an amount of 0.1-10 parts by weight based on 100 parts by weight of the electrode active material layer. Further, the conductive material may be present in an amount of 0.1-10 parts by weight based on 100 parts by weight of the electrode active material layer.

According to an embodiment, crosslinking of the binder (binder resin) in the electrode active material layer may be carried out by introducing a crosslinking agent solution as described hereinafter. According to an embodiment, the crosslinking is performed over the whole electrode assembly after the electrode assembly is totally impregnated with the crosslinking agent solution. Therefore, the binder may be crosslinked even at the interface between the electrode and a separator. According to another embodiment, the crosslinking may be performed only in the electrode depending on the object to be impregnated with the crosslinking agent solution.

According to the present disclosure, the electrode active material layer shows improved mechanical properties, such as elasticity or rigidity, of the electrode layer through the crosslinking of the binder (binder resin). Thus, it is possible to inhibit or reduce the effect of swelling and/or shrinking of the electrode active material during charging/discharging. In addition, the interfacial adhesion between the electrode active material layer and the electrolyte layer is retained to provide a solid state battery having excellent cycle characteristics.

According to an embodiment, the binder (binder resin) includes a rubber-based binder resin. As described hereinafter, the rubber-based binder resin can be dissolved in a nonpolar solvent. A sulfide-based solid electrolyte ingredient may cause degradation of physical properties, such as a decrease in ion conductivity, when it is in contact with a polar solvent. Thus, according to the present disclosure, use of a polar solvent is avoided during the manufacture of an electrode, and a rubber-based binder resin having high solubility to a nonpolar solvent is used as a binder ingredient. According to an embodiment of the present disclosure, the rubber-based binder resin may be selected from the binder resins that can be dissolved in the solvent to be used in an amount of 50 wt % or more, 70 wt % or more, 90 wt % or more, or 99 wt % or more. In addition, as described hereinafter, the solvent includes a nonpolar solvent having a polarity index of 0-3 and/or a dielectric constant less than 5. It is possible to prevent a decrease in ion conductivity of a sulfide-based solid electrolyte caused by the use of a polar solvent by using such a nonpolar solvent.

According to the present disclosure, when the electrode is a positive electrode, the positive electrode active material may include any one selected from: a layered compound such as lithium manganese composite oxide ($LiMn_2O_4$, $LiMnO_2$, etc.), lithium cobalt oxide ($LiCoO_2$) or lithium nickel oxide ($LiNiO_2$), or a compound substituted with one or more transition metals; lithium manganese oxide such as $Li_{1-x}Mn_{2-x}O_4$ (wherein x is 0-0.33), $LiMnO_3$, $LiMn_2O_3$ or $LiMnO_2$; lithium copper oxide ($Li_2CuO_2$); vanadium oxide, such as $LiV_3O_8$, $LiFe_3O_4$, $V_2O_5$, $Cu_2V_2O_7$, or the like; Ni-site type lithium nickel oxide represented by the chemical formula of $LiNi_{1-x}M_xO_2$ (wherein M=Co, Mn, Al, Cu, Fe, Mg, B or Ga, and x=0.01-0.3); lithium manganese composite oxide represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which a part of Li is substituted with alkaline earth metal ions; disulfide compound; and $Fe_2(MoO_4)_3$, or a combination of two or more of them.

According to the present disclosure, when the electrode is a negative electrode, the negative electrode active material may include any one selected from: carbon such as non-graphitizable carbon or graphite-based carbon; metal composite oxides, such as $Li_xFe_2O_3$ (0≤x≤1), $Li_xWO_2$ (0≤x≤1), $Sn_xMe_{1-x}Me'_yO_z$ (Me:Mn, Fe, Pb, Ge; Me':Al, B, P, Si, elements of Group 1, 2 or 3 in the Periodic Table, halogen; 0<x≤1; 1≤y≤3; 1≤z≤8); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide, or a combination of two or more of them.

The binder (binder resin) may include a rubber-based binder resin. Since a PVdF-based binder resin or acrylic binder resin used as a binder for an electrode has low solubility to a nonpolar solvent, it is difficult to prepare an electrode slurry. Therefore, according to the present disclosure, a rubber-based resin having high solubility to a nonpolar solvent is used as a binder. According to an embodiment of the present disclosure, the rubber-based binder resin may include at least one selected from the group consisting of natural rubber, butyl rubber, bromobutyl rubber, chlorobutyl rubber, styrene isoperene rubber, styrene-ethylene-butyrene-styrene rubber, acrylonitrile-butadiene-styrene rubber, polybutadiene rubber, nitrile butadiene rubber, styrene butadiene rubber, styrene butadiene styrene (SBS) rubber and ethylene propylene diene monomer (EPDM) rubber.

According to an embodiment of the present disclosure, the solid electrolyte is not particularly limited and may include at least one inorganic solid electrode, such as a crystalline solid electrolyte, non-crystalline solid electrolyte or glass ceramic solid electrolyte. According to an embodiment of the present disclosure, the solid electrolyte may include a sulfide-based solid electrolyte and particular examples thereof include lithium sulfide, silicon sulfide, germanium sulfide and boron sulfide. Particular examples of the inorganic solid electrolyte include a LPS type solid electrolyte, such as $Li_2S$—$P_2S_5$, $Li_{3.833}Sn_{0.833}As_{0.166}S_4$, $Li_4SnS_4$, $Li_{3.25}Ge_{0.25}P_{0.75}S_4$, $B_2S_3$—$Li_2S$, $xLi_2S$-(100–x)$P_2S_5$ (x=70-80), $Li_2S$—$SiS_2$—$Li_3N$, $Li_2S$—$P_2S_5$—LiI, $Li_2S$—$SiS_2$—LiI, $Li_2S$—$B_2S_3$—LiI, $Li_3N$, LISICON, LIPON ($Li_{3+y}PO_{4-x}N_x$), Thio-LISICON ($Li_{3.25}Ge_{0.25}P_{0.75}S_4$), $Li_2O$—$Al_2O_3$—$TiO_2$—$P_2O_5$ (LATP), or the like.

According to an embodiment of the present disclosure, particular examples of the conductive material include any one selected from the group consisting of graphite, carbon black, carbon fibers or metallic fibers, metal powder, conductive whisker, conductive metal oxide, activated carbon and polyphenylene derivatives, or a combination of two or more of such conductive materials. More particularly, the conductive material may include any one selected from the group consisting of natural graphite, artificial graphite, super-p, acetylene black, ketjen black, channel black, furnace black, lamp black, thermal black, denka black, aluminum powder, nickel powder, zinc oxide, potassium titanate and titanium oxide, or a combination of two or more of such conductive materials.

The current collector is not particularly limited, as long as it has high conductivity while not causing any chemical change in the corresponding battery. Particular examples of the current collector include stainless steel, copper, aluminum, nickel, titanium, baked carbon, or aluminum or stainless steel surface-treated with carbon, nickel, titanium, silver, or the like.

According to an embodiment of the present disclosure, the solid electrolyte layer 50 may include a solid electrolyte and an electrolyte binder. The electrolyte binder may be a nonpolar resin having no polar functional group. Therefore, the electrolyte binder is inactive to a highly reactive solid electrolyte, particularly to a sulfide-based solid electrolyte. The electrolyte layer 50 may not cause swelling/shrinking due to charging/discharging, like the electrode active material. In addition, when a material other than the solid electrolyte is incorporated to the solid electrolyte layer, the grain boundary resistance between solid electrolyte particles tends to be increased. Thus, no crosslinking agent may be added when forming the solid electrolyte layer.

According to an embodiment of the present disclosure, particular examples of the electrolyte binder may include styrene-based thermoplastic elastomers, such as styrene butadiene styrene (SBS) block polymer, styrene ethylene butadiene styrene (SEBS) block polymer or styrene-styrene butadiene-styrene block polymer, styrene butadiene rubber (SBR), butadiene rubber (BR), natural rubber (NR), isoprene rubber (IR), ethylene-propylene-diene monomer (EPDM) terpolymer, and partially hydrogenated products thereof. In addition, the electrolyte binder may include at least one selected from polystyrene, polyolefin, olefinic thermoplastic elastomer, polycycloolefin, silicone resin, nitrile rubber (NBR), chloroprene rubber (CR) and partially or totally hydrogenated products thereof, polyacrylate copolymers, polyvinylidene fluoride (PVDF), vinylidene fluoride-co-hexafluoropropylene (VDF-HFP) and carboxylic acid-modified products thereof, chloropolyethylene (CM), polymethacrylate, polyvinyl alcohol, ethylene-vinyl alcohol copolymer, polyimide, polyamide and polyamideimide.

In another aspect, there is provided a method for manufacturing an electrode assembly for a solid state battery.

According to the present disclosure, a nonpolar solvent is used to prepare an electrode slurry and use of a polar solvent is avoided. Thus, it is possible for a solid electrolyte to maintain a high level of ion conductivity without degradation thereof. In addition, according to the present disclosure, the electrode includes a rubber-based binder resin as a binder and the rubber-based binder resin is subjected to intermolecular crosslinking and shows improved binding force. Thus, it is possible to prevent the problem of separation of an electrode active material or solid electrolyte particles from an electrode.

Figure 2:
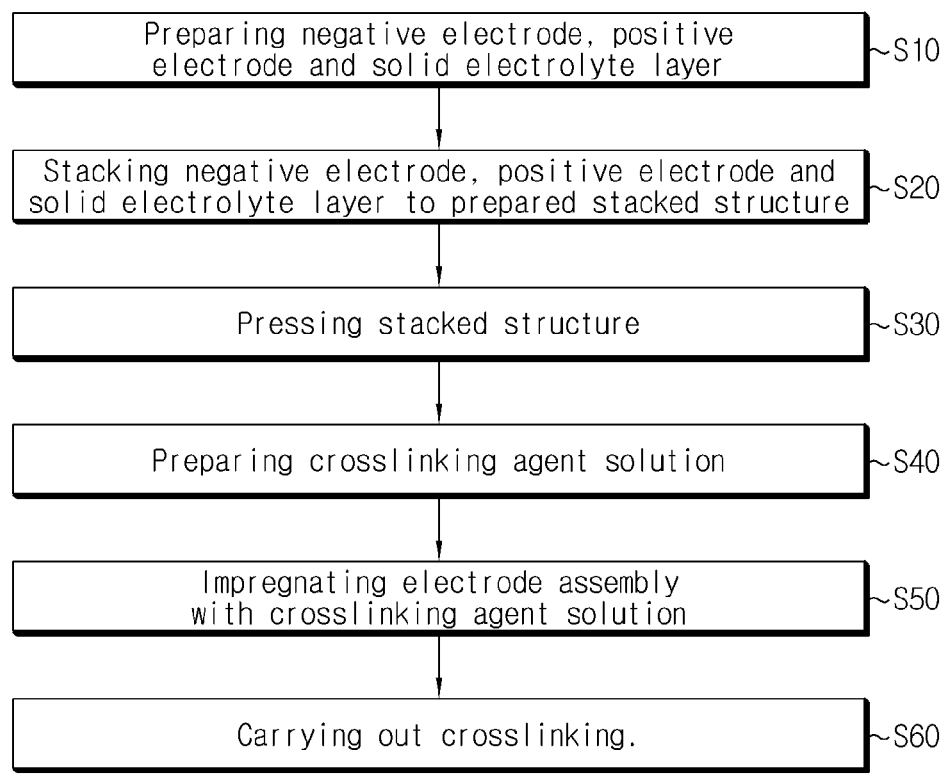
FIG. 2 is a flow chart illustrating the method for manufacturing an electrode assembly for a solid state battery according to the present disclosure.

FIG. 2 is a flow chart illustrating the method for manufacturing an electrode assembly for a solid state battery according to the present disclosure. Hereinafter, the method for manufacturing an electrode assembly for a solid state battery will be explained in detail with reference to FIG. 2.

First, a negative electrode, a positive electrode and a solid electrolyte layer are prepared (S10).

According to an embodiment of the present disclosure, the electrode may be prepared by the method as described hereinafter. A slurry for forming an electrode layer including an electrode active material, a binder (binder resin), an inorganic solid electrolyte and a solvent is prepared. According to an embodiment of the present disclosure, the solvent includes a nonpolar solvent and use of a polar solvent, such as water or NMP, is preferably avoided in the process for manufacturing an electrode. According to an embodiment of the present disclosure, the solvent includes a nonpolar solvent that may have a polarity index of 0-3.0 and/or a dielectric constant less than 5. According to an embodiment of the present disclosure, particular examples of the solvent may include any one selected from pentane, cyclohexane, toluene, benzene, xylene, hexane, anisole, heptane, chloroform, diethyl ether and butyl butyrate, or a combination of two or more such nonpolar solvents. The method for manufacturing an electrode according to the present disclosure uses no polar solvent, such as water or NMP, and thus can prevent a decrease in ion conductivity of a sulfide-based solid electrolyte.

Meanwhile, according to an embodiment, a crosslinking initiator may be further used when manufacturing the electrode. When a crosslinking initiator is added during the process for manufacturing an electrode, crosslinking of a binder may be further carried out in the stage of the manufacture of the electrode. Otherwise, crosslinking may be carried out only once after introducing a crosslinking initiator solution to an electrode assembly, as described hereinafter.

According to an embodiment, the crosslinking initiator is a material capable of crosslinking the binder (binder resin) to form a three-dimensional network structure. According to the present disclosure, an organic peroxide-based initiator is used as a crosslinking initiator. In the case of vulcanization crosslinking using a sulfur ingredient as a crosslinking agent, sulfur is not dissolved in a (nonpolar) organic solvent during the preparation of an electrode slurry. Therefore, when using a nonpolar organic solvent as a solvent for preparing a slurry, it is difficult to obtain a slurry. In addition, in the case of vulcanization crosslinking using a sulfur ingredient, it is required to carry out crosslinking at a high temperature of 160° C. or higher, thereby providing low processability. In addition, under an excessively high temperature condition, the electrode active material or binder resin may be deteriorated, which may lead to degradation of the performance of a battery.

According to an embodiment of the present disclosure, particular examples of the organic peroxide-based crosslinking initiator may include at least one selected from the group consisting of di(2-ethylhexyl)peroxydicarbonate, di(4-t-butylcyclohexyl) peroxydicarbonate, di-sec-butylperoxydicarbonate, t-butylperoxyneodecanoate, t-hexylperoxy pivalate, t-butylperoxy pivalate, dilauroyl peroxide, di-n-octanoyl peroxide, 1,1,3,3-tetramethylbutylperoxy-2-ethylhexanoate, di(4-methylbenzoyl) peroxide, dibenzoyl peroxide, t-butylperoxyisobutyrate and 1,1-di(t-hexylperoxy)cyclohexane.

Next, the prepared slurry is applied to at least one surface of a current collector and dried to form an electrode layer (a). After applying the slurry, the solvent is dried to solidify the electrode layer (a). The drying may be carried out at room temperature, or if desired, the electrode may be heated to accelerate the removal of the solvent. When the electrode includes a crosslinking initiator, it is required to control the drying to a temperature range where the crosslinking initiator does not react.

Then, the electrode layer (a) is pressed to obtain an electrode layer (a'). As used herein, the electrode layer (a') refers to the electrode layer (a) after it is pressurized in this step. By virtue of the pressurization, the electrode active material, solid electrolyte particles and the conductive material are bound closely to each other in the electrode to improve the ion conductivity and electron conductivity. In addition, by virtue of the pressing, the electrode may have an air permeability controlled to a range of 4 sec/100 cc to 3600 sec/100 cc depending on the purpose of use. For example, the air permeability may be 50 sec/100 cc, 100 sec/100 cc, 300 sec/100 cc, 500 sec/100 cc or 1,000 sec/100 or more within the above-defined range. In addition, the upper limit of the air permeability may be 3,000 sec/100 cc, 2,500 sec/100 cc, 2,000 sec/100 cc, 1,500 sec/100 cc, 1,000 sec/100 cc or 500 sec/100 cc. The air permeability means the time required for 100 cc of air to pass through the electrode, is expressed in the unit of second/100 cc, and is also referred to as permeability of Gurley value.

When the electrode layer slurry includes an initiator, the electrode layer (a) is optionally heated so that the binder may be crosslinked by the crosslinking agent. In this step, the heating is carried out at a temperature controlled to 45° C.-150° C. The heating may be controlled to a temperature range where crosslinking is initiated and performed within the above-defined range.

For example, the solid electrolyte layer may be obtained by the method which includes preparing a slurry for forming an electrolyte layer containing a binder, inorganic solid electrolyte and a solvent, applying the slurry to an adequate release sheet and drying the slurry, and separating the electrolyte layer from the release sheet. Herein, the binder (binder resin), inorganic solid electrolyte and the solvent are the same as described above with reference to the manufacture of an electrode. For example, the binder of the solid electrolyte layer may include a rubber-based binder resin, and the inorganic solid electrolyte may include a sulfide-based solid electrolyte. In addition, the solvent includes a nonpolar solvent preferably having a polarity index of 0-3 and/or a dielectric constant less than 5. Meanwhile, according to an embodiment of the present disclosure, the above-mentioned crosslinking initiator may be further added to the slurry for forming a solid electrolyte layer. Herein, if desired, the solid electrolyte layer may be prepared by setting the drying temperature of the slurry for a solid electrolyte layer to a temperature range where the crosslinking initiator initiates the reaction, or higher.

In this manner, the electrode and solid electrolyte may be prepared in step (S10). According to an embodiment of the present disclosure, in the electrode and/or solid electrolyte layer, the binder ingredients contained therein may be crosslinked or not.

Then, the electrode and the solid electrolyte layer prepared from step (S10) are stacked to provide a stacked structure (S20). In the stacked structure, the negative electrode and the positive electrode are disposed so that they may be electrically insulated from each other by the solid electrolyte layer. After that, the obtained stacked structure is pressed to obtain an electrode assembly (a) (S30). By virtue of the pressing, an electrode assembly (a) in which the electrode layer is bound with the electrolyte layer is formed.

Then, a crosslinking initiator is mixed with a solvent to prepare a crosslinking agent solution (S40). The crosslinking initiator and the solvent used in this step are the same as described above. According to an embodiment of the present disclosure, the crosslinking initiator is an organic peroxide-based crosslinking initiator, and the solvent includes a nonpolar solvent having a polarity index of 0-3 and/or a dielectric constant less than 5. Thus, it is preferred to avoid the use of a polar solvent when preparing the crosslinking agent solution.

When the crosslinking agent solution is prepared, the electrode assembly (a) of step (S30) is impregnated with the solution so that the crosslinking agent may infiltrate into the electrode assembly (a) (S50). After taking the electrode assembly out of the solution, crosslinking is initiated so that the binder contained in the electrode assembly may be crosslinked (S60). The crosslinking may be carried out by warming the electrode assembly to the crosslinking initiation temperature of the crosslinking agent or higher. After this step, the binders disposed at the interface between the electrode layer and the electrode assembly are crosslinked to form a three-dimensional network, and the binding force between the electrode layer and the electrolyte layer is improved through the crosslinking. It is preferred to initiate the crosslinking in a temperature range where the reaction of the crosslinking agent is initiated and performed.

Hereinafter, the present disclosure will be explained in detail with reference to examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

$LiNi_{0.8}Mn_{0.1}Co_{0.1}O_2$ (NMC811), $Li_3PS_4$ (LPS) as a sulfide-based solid electrolyte, FX35 as a conductive material and butadiene rubber were mixed at a weight ratio of 65:31.5:1.5:2 to form a slurry through mortar mixing. The formed slurry was coated on aluminum foil by applying the slurry thereto to a thickness of 200 μm and carrying out drying to obtain a positive electrode.

Graphite, $Li_3PS_4$ (LPS) as a sulfide-based solid electrolyte, FX35 as a conductive material and butadiene rubber as a binder were mixed at a weight ratio of 50:45:1.5:3.5 to form a slurry through mortar mixing. The formed slurry was coated on copper foil by applying the slurry thereto to a thickness of 200 μm and carrying out drying to obtain a negative electrode.

Then, $Li_3PS_4$ (LPS) as a sulfide-based solid electrolyte and butadiene rubber were mixed at a weight ratio of 98:2 to form a slurry through mortar mixing. The formed slurry was coated on the negative electrode obtained as described above by applying the slurry thereto to a thickness of 200 μm and carrying out drying. After that, the positive electrode and the negative electrode were stacked with the electrolyte layer interposed therebetween and the stacked structure was pressurized by using a hydraulic press (200 MPa) to obtain an electrode assembly. Then, dicumyl peroxide was introduced to xylene to prepare a crosslinking agent solution (concentration: 40%). The electrode assembly was dipped in the crosslinking agent solution and was allowed to stand for about 0.2 hours so that the voids in the electrode assembly might be impregnated with the crosslinking agent solution. After that, the impregnated electrode assembly was introduced to a vacuum oven at 80° C. and was allowed to stand for about 8 hours to carry out crosslinking of the binder and evaporation of the organic solvent. In this manner, an electrode assembly was obtained.

Example 2

An electrode assembly was obtained in the same manner as described in Example 1, except that the pressurization was further carried out under 400 MPa in the final step.

Comparative Example 1

$LiNi_{0.8}Mn_{0.1}Co_{0.1}O_2$ (NMC811), $Li_3PS_4$ (LPS) as a sulfide-based solid electrolyte, FX35 as a conductive material and butadiene rubber were mixed at a weight ratio of 65:31.5:1.5:2 to form a slurry through mortar mixing. The formed slurry was coated on aluminum foil by applying the slurry thereto to a thickness of 200 μm and carrying out drying to obtain a positive electrode. Next, graphite, $Li_3PS_4$ (LPS) as a sulfide-based solid electrolyte, FX35 as a conductive material and butadiene rubber were mixed at a weight ratio of 50:45:1.5:3.5 to form a slurry through mortar mixing. The formed slurry was coated on copper foil by applying the slurry thereto to a thickness of 200 μm and carrying out drying to obtain a negative electrode. Then, Li$_3$PS$_4$ (LPS) as a sulfide-based solid electrolyte and butadiene rubber were mixed at a weight ratio of 98:2 to form a slurry through mortar mixing. The formed slurry was coated on the negative electrode obtained as described above to a thickness of 200 μm. After that, the positive electrode and the negative electrode were stacked with the electrolyte layer interposed therebetween and the stacked structure was pressurized by using a hydraulic press (200 MPa) to obtain an electrode assembly.

Comparative Example 2

An electrode assembly was obtained in the same manner as described in Comparative Example 1, except that the pressure of the hydraulic press was 400 MPa.

Results of Evaluation of Electrode Peel Strength

Each of the electrode assemblies was determined for the peel strength at each of the interface between the positive electrode and the electrolyte membrane and the interface between the negative electrode and the electrolyte membrane. The results are shown in the following Table 1. In the case of Example 1 in which crosslinking is induced after the pressing under 200 MPa, it shows higher interfacial adhesion as compared to Comparative Example 1 in which a pressure of 200 MPa is merely applied. Example 2 in which a pressure of 400 MPa is further applied after carrying out Example 1 shows higher interfacial adhesion as compared to Comparative Example 2 in which a pressure of 400 MPa is merely applied without crosslinking. It can be seen that when a solid state battery is manufactured by applying higher pressure or by using crosslinking treatment, interfacial adhesion can be improved.

TABLE 1

|  | Example 1 | Example 2 | Comp. Ex. 1 | Comp. Ex. 2 |
|---|---|---|---|---|
| Positive electrode/electrolyte membrane adhesion (gf) | 72 | 113 | 43 | 81 |
| Negative electrode/electrolyte membrane adhesion (gf) | 33 | 89 | 14 | 50 |

Determination of Charge Transfer Resistance

Each of the electrode assemblies according Examples 1 and 2 and Comparative Examples 1 and 2 was introduced to a casing to obtain a battery. Each solid state battery was charged to 4.2 V at a C-rate of 0.05 C, and then the charge transfer resistance of the cell was measured. In the case of Example 1, it shows a lower Rct as compared to Comparative Example 1 using no crosslinking. Example 2 in which a pressure of 400 MPa is further applied after carrying out Example 1 shows a lower Rct as compared to Comparative Example 2. It can be seen that when a solid state battery is manufactured by applying higher pressure or by using crosslinking treatment, Rct resistance can be reduced through the formation of a dense interface.

TABLE 2

|  | Example 1 | Example 2 | Comp. Ex. 1 | Comp. Ex. 2 |
|---|---|---|---|---|
| Rct (ohm) | 130 | 80 | 160 | 120 |

What is claimed is:

1. A method for manufacturing a solid state battery comprises the following steps (S10)-(S60) of:
    (S10) preparing at least one negative electrode, at least one positive electrode and at least one solid polymer electrolyte layer;
    (S20) carrying out stacking in such a manner that the at least one solid polymer electrolyte layer is interposed between the at least one negative electrode and the at least one positive electrode to prepare a stacked structure;
    (S30) pressing the stacked structure to form an electrode assembly (a);
    (S40) mixing a crosslinking initiator with a solvent to prepare a crosslinking agent solution;
    (S50) impregnating the electrode assembly (a) with the solution; and
    (S60) warming the impregnated electrode assembly (a) to form an electrode assembly (a'), wherein step (S60) is carried out in such a temperature range that crosslinking may be initiated and performed in the electrode assembly (a'),
    wherein the positive electrode, the negative electrode and the solid electrolyte layer comprise a binder polymer resin, and the binder polymer resin is crosslinked to form an interlayer continuous phase at the interface between the negative electrode and the solid polymer electrolyte layer and at the interface between the positive electrode and the solid polymer electrolyte layer.

2. The method for manufacturing a solid state battery according to claim 1, wherein the positive electrode and the negative electrode are obtained by a method comprising the following steps of:
    preparing a slurry for forming an electrode layer comprising an electrode active material, a binder resin, an inorganic solid electrolyte and a solvent, wherein the solvent is a nonpolar solvent;
    applying the slurry for forming the electrode layer to the surface of a current collector, followed by drying, to form a first electrode layer; and
    pressing the first electrode layer to form a second electrode layer.

3. The method for manufacturing a solid state battery according to claim 1, wherein the solid polymer electrolyte layer is obtained by a method comprising the following steps of:
    preparing a slurry for forming the solid polymer electrolyte layer comprising a binder resin, an inorganic solid electrolyte and a solvent, wherein the solvent is a nonpolar solvent;
    applying the slurry to a release sheet, followed by drying, to form the solid polymer electrolyte layer; and
    separating the solid polymer electrolyte layer from the release sheet.

4. The method for manufacturing a solid state battery according to claim 1, wherein the solvent in step (S40) is a nonpolar solvent.

5. The method for manufacturing a solid state battery according to claim 1, wherein the negative electrode, the positive electrode and the solid polymer electrolyte layer comprise a binder resin, and the binder resin comprises a rubber-based resin.

6. The method for manufacturing a solid state battery according to claim 1, wherein the crosslinking initiator in step (S40) is an organic peroxide-based crosslinking initiator.

7. The method for manufacturing a solid state battery according to claim 6, wherein the organic peroxide-based crosslinking initiator is at least one selected from the group consisting of di(2-ethylhexyl)peroxydicarbonate, di(4-t-butylcyclohexyl)peroxydicarbonate, di-sec-butylperoxydicarbonate, t-butylperoxyneodecanoate, t-hexylperoxy pivalate, t-butylperoxy pivalate, dilauroyl peroxide, di-n-octanoyl peroxide, 1,1,3,3-tetramethylbutylperoxy-2-ethylhexanoate, di(4-methylbenzoyl) peroxide, dibenzoyl peroxide, t-butylperoxyisobutyrate and 1,1-di(t-hexylperoxy)cyclohexane.

8. A solid state battery obtained by the method as defined in claim 1.

9. The solid state battery according to claim 8, wherein the binder resin comprises a rubber-based binder resin.

10. The solid state battery according to claim 9, wherein the rubber-based binder resin comprises at least one selected from the group consisting of natural rubber, butyl rubber, bromobutyl rubber, chlorobutyl rubber, styrene isoperene rubber, styrene-ethylene-butyrene-styrene rubber, acrylonitrile-butadiene-styrene rubber, polybutadiene rubber, nitrile butadiene rubber, styrene butadiene rubber, styrene butadiene styrene (SBS) rubber and ethylene propylene diene monomer (EPDM) rubber.

* * * * *